(12) United States Patent
Biswas

(10) Patent No.: US 9,705,929 B2
(45) Date of Patent: Jul. 11, 2017

(54) METHOD AND APPARATUS FOR TRANSFORMING APPLICATION ACCESS AND DATA STORAGE DETAILS TO PRIVACY POLICIES

(71) Applicant: Nokia Technologies Oy, Espoo (FI)

(72) Inventor: Debmalya Biswas, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/015,634

(22) Filed: Feb. 4, 2016

(65) Prior Publication Data

US 2016/0156670 A1    Jun. 2, 2016

Related U.S. Application Data

(63) Continuation of application No. 14/069,912, filed on Nov. 1, 2013, now Pat. No. 9,294,364.

(51) Int. Cl.
| | |
|---|---|
| G06F 13/00 | (2006.01) |
| H04L 29/06 | (2006.01) |
| H04L 12/24 | (2006.01) |
| H04W 12/02 | (2009.01) |
| H04W 4/00 | (2009.01) |
| G06F 17/27 | (2006.01) |

(52) U.S. Cl.
CPC .......... *H04L 63/20* (2013.01); *G06F 17/2705* (2013.01); *H04L 41/50* (2013.01); *H04W 4/001* (2013.01); *H04W 4/003* (2013.01); *H04W 12/02* (2013.01)

(58) Field of Classification Search
CPC .................................. G06F 9/541; H04L 63/20
USPC ................................................ 719/328; 726/1
See application file for complete search history.

(56) References Cited

U.S. PATENT DOCUMENTS

| | | | |
|---|---|---|---|
| 8,265,595 B1 | 9/2012 | Reeves et al. | |
| 8,655,307 B1 * | 2/2014 | Walker .............. | H04W 52/0212 455/343.5 |

(Continued)

FOREIGN PATENT DOCUMENTS

CN    101493874 A    7/2009

OTHER PUBLICATIONS

Wikipedia, "Static program analysis", web page retrieved on Feb. 6, 2014 from http://en.wikipedia.org/wiki/Static_program_analysis, pp. 1-5.

(Continued)

*Primary Examiner* — Andy Ho
(74) *Attorney, Agent, or Firm* — Ditthavong & Steiner, P.C.

(57) ABSTRACT

An approach is provided for transforming application access and data storage details associated with a mobile device to application specific privacy policies. A policy platform processes and/or facilitates a processing of an application code to identify one or more application programming interfaces invoked by the application code. The policy platform causes, at least in part, a profiling of one or more invocation characteristics of the one or more application programming interfaces. The policy platform further causes, at least in part, a mapping of the one or more invocation characteristics against one or more policy templates to cause, at least in part, a generation of at least one policy for the application code.

17 Claims, 10 Drawing Sheets

(56) References Cited

U.S. PATENT DOCUMENTS

| | | | |
|---|---|---|---|
| 8,806,568 B2* | 8/2014 | Biazetti | H04L 65/40 |
| | | | 726/1 |
| 9,021,592 B2 | 4/2015 | Heitzman | |
| 9,479,398 B2* | 10/2016 | Abuelsaad | H04L 41/0893 |
| 2009/0183227 A1 | 7/2009 | Isaacs et al. | |
| 2013/0067531 A1 | 3/2013 | Morris et al. | |
| 2014/0096188 A1 | 4/2014 | Mont et al. | |

OTHER PUBLICATIONS

Furtsch, "Building Privacy Policies for Mobile Apps", web page retrieved on Feb. 6, 2014 from http://www.truste.com/blog/2011/09/27/building-privacys-policies-for-mobile-apps/, pp. 1-4.

QtMobility Projects Apis, "Qt Mobilty Project Reference Documentation", web page retrieved on Feb. 6, 2014 from http://doc-snapchat.qt-project.org/qt-mobility/, pp. 1-6.

Gilbert et al., "Automating Privacy Testing of Smartphone Applications" Duke University, Jun. 2011, pp. 1-5.

Simon, "Mobile Apps Privacy Policy Generator," retrieved from <http://forrst.com/posts/Mobile_Apps_Privacy_Policy_Generator-FQs>, dated Sep. 4, 2013, 3 pages.

* cited by examiner

METHOD AND APPARATUS FOR TRANSFORMING APPLICATION ACCESS AND DATA STORAGE DETAILS TO PRIVACY POLICIES

RELATED APPLICATION

This application is a continuation of U.S. patent application Ser. No. 14/069,912 filed Nov. 1, 2013, now U.S. Pat. No. 9,294,364, entitled "Method and Apparatus for transforming application access and data storage details to privacy policies", which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest has been the development of increasingly complex and user-friendly applications for mobile devices (e.g., mobile phones, smartphones, phablets, and/or tablets). Such applications often rely on the fact that many of today's mobile devices are capable of collecting personal real-time information about their users (e.g., location, activity, etc.) with the help of sensors embedded in the devices (e.g., a global positioning system (GPS) receiver). Unfortunately, cases of misuse of such private information have been steadily rising. Media coverage about such attacks has helped to increase awareness among users about the privacy risks associated with mobile devices. As a result, privacy consciousness among users is increasing, and users are increasingly interested in knowing more about the data requirements of applications before installing them on their devices. However, many mobile application developers are ill-prepared to address this challenge (e.g., many developers come from a desktop programming background. Accordingly, services providers and device manufacturers face significant challenges in providing a service that transforms application access and data storage details associated with a mobile device to privacy policies.

Some Example Embodiments

Therefore, there is a need for an approach for transforming application access and data storage details associated with a mobile device to application specific privacy policies.

According to one embodiment, a method comprises processing and/or facilitating a processing of an application code to identify one or more application programming interfaces invoked by the application code. The method also comprises causing, at least in part, a profiling of one or more invocation characteristics of the one or more application programming interfaces. The method further comprises causing, at least in part, a mapping of the one or more invocation characteristics against one or more policy templates to cause, at least in part, a generation of at least one policy for the application code.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of an application code to identify one or more application programming interfaces invoked by the application code. The apparatus also causes, at least in part, a profiling of one or more invocation characteristics of the one or more application programming interfaces. The apparatus is further causes, at least in part, a mapping of the one or more invocation characteristics against one or more policy templates to cause, at least in part, a generation of at least one policy for the application code.

According to another embodiment, a computer-readable storage medium carries one or more sequences of one or more instructions which, when executed by one or more processors, cause, at least in part, an apparatus to process and/or facilitate a processing of an application code to identify one or more application programming interfaces invoked by the application code. The apparatus also causes, at least in part, a profiling of one or more invocation characteristics of the one or more application programming interfaces. The apparatus is further causes, at least in part, a mapping of the one or more invocation characteristics against one or more policy templates to cause, at least in part, a generation of at least one policy for the application code.

According to another embodiment, an apparatus comprises means for processing and/or facilitating a processing of an application code to identify one or more application programming interfaces invoked by the application code. The apparatus also comprises means for causing, at least in part, a profiling of one or more invocation characteristics of the one or more application programming interfaces. The apparatus further comprises means for causing, at least in part, a mapping of the one or more invocation characteristics against one or more policy templates to cause, at least in part, a generation of at least one policy for the application code.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for transforming application access and data storage details associated with a mobile device to application specific privacy policies are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
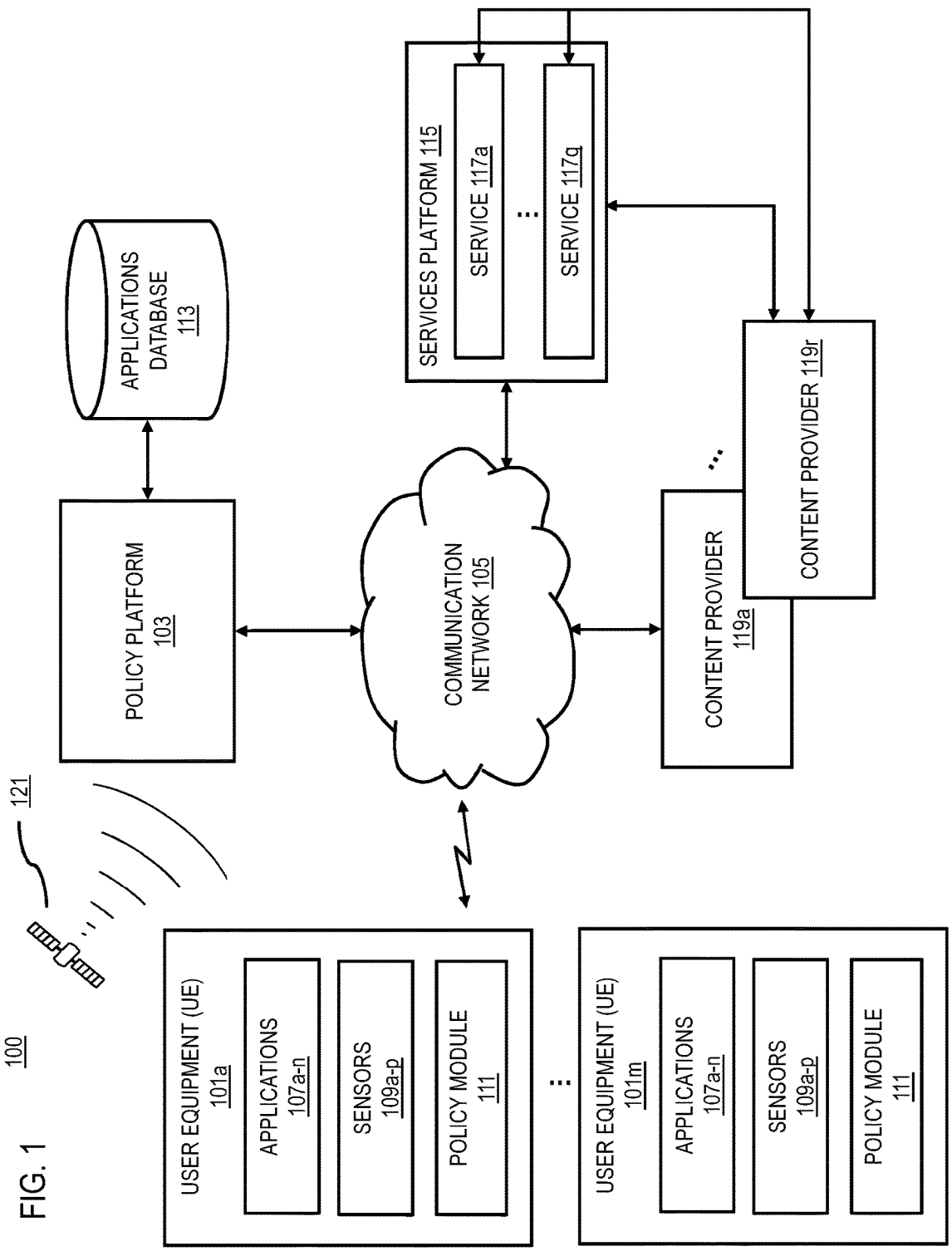
FIG. 1 is a diagram of a system capable of transforming application access and data storage details associated with a mobile device to application specific privacy policies, according to one embodiment.

FIG. 1 is a diagram of a system capable of transforming application access and data storage details associated with a mobile device to application specific privacy policies, according to one embodiment. As previously discussed, one area of interest has been the development of increasingly complex and user-friendly applications for mobile devices. Such applications often rely on the fact that many of today's mobile devices are capable of collecting personal real-time information about their users with the help of sensors embedded in the devices. While this information can be, and is indeed, used to provide useful and context-relevant services to users, it can also be misused with considerable privacy implications. In particular, cases of such misuse have been steadily rising (e.g., the number of malware apps on the Android operating system) not only in numbers, but also in their complexity and seriousness. Media coverage about such attacks has helped to increase awareness among users about the privacy risks associated with mobile devices. As a result, privacy consciousness among users is increasing, and users are increasingly interested in knowing more about the data requirements of applications before installing them on their devices. However, many mobile application developers are ill-prepared to address this challenge. In particular, many developers come from a desktop programming background and are unaware of the privacy issues specific to mobile devices such as smartphones. Further, many developers consider code testing and privacy documentation as an overhead and the current manual approach of review is likely to miss numerous application access and data storage details.

To address this problem, a system 100 of FIG. 1 introduces the capability to transform application access and data storage details associated with a mobile device to application specific privacy policies. As shown in FIG. 1, the system 100 comprises one or more user equipment (UE) 101a-101m (e.g., mobile phones, smartphones, phablets, and/or tablets)(also collectively referred to as UEs 101) having connectivity to a policy platform 103 via a communication network 105. The UEs 101 include or have access to one or more applications 107a-107n (also collectively referred to as applications 107). By way of example, the applications 107 may include mapping and/or navigation applications, location-based applications (e.g., enabling location "check-ins"), a weather application, traffic applications, an Internet browser, media applications, social networking applications, etc. In addition, the UEs 101 include one or more sensors 109a-109p (also collectively referred to as sensors 109). In particular, the sensors include, for example, a GPS receiver, an altitude sensor, an accelerometer, etc. Further, the UEs 101 include a policy module 111 that has substantially similar capabilities as the policy platform 103 to locally intercept one or more access requests by one or more applications 107.

In one embodiment, the policy platform 103/policy module 111 may include or be associated with at least one applications database 113, which may exist in whole or in part within the policy platform 103 or the policy module 111. The at least one applications database 113 may include one or more privacy policy templates with one or more variable privacy parameters. For example, "App A uses your <d> data. The app collects this data by accessing resources <r1, r2, . . . > on your phone. The sensors are accessed periodically with frequency <f> and/or user initiated <ui>. The access data is stored on <s>. The stored data is shared with parties <p1, p2, . . . >. This collected <d> data is used to infer the following information about you: <level>." The at least one applications database 113 may also include one or more pre-defined text entries corresponding to one or more inference levels (e.g., Inference level—Medium: "The collected location data is used to infer your location in real-time"), one or more lists of users/groups that have access to the at least one applications database 113, or a combination thereof.

In one embodiment, the UEs 101 are also connected a services platform 115 via the communication network 105. In one or more embodiments, the services platform 115 includes one or more services 117*a-q* (also collectively referred to as services 117). The services 117 may include a wide variety of services such as content provisioning services for one or more of the applications 107 (e.g., updated traffic/weather information). In one embodiment, the services 117 may also include a service for computing one or more finite state machines for one or more applications 107. In addition, the UEs 101, the services platform 115, and the services 117 are also connected to one or more content providers 119*a*-119*r* (also collectively referred to as content providers 119) via the communication network 105. The content providers 119 also may provide a wide variety of content to the components of the system 100 (e.g., one or more updates of the one or more users/groups that have access to one or more database tables).

In one embodiment, the applications 107 (e.g., a location-based "check-in" application, a weather application, etc.) utilize location-based technologies (e.g., GPS, cellular triangulation, Assisted GPS (A-GPS), etc.) to make a request to the services 117 and/or the content providers 119 for location-based data (e.g., weather conditions) based on a position relative to a UE 101. For example, a UE 101 may include a GPS receiver 109 to obtain geographic coordinates from the satellites 121 to determine its current position.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 processes and/or facilitates a processing of an application code to identify one or more application programming interfaces (APIs) invoked by the application code. In particular, applications usually interact with mobile devices (e.g., a UE 101) by invoking one or more APIs of the mobile platform software development kit (SDK). For example, such a middleware framework could be the Qt Mobility API. More specifically, the QT Mobility API is organized into frameworks (e.g., location, contacts, messaging, multimedia, sensors, etc.). In addition to the QT Mobility API, other mobile SDKs such as the Windows Phone SDK, the Android SKD, etc. are equally applicable. By way of example, the system 100 processes the application code via one or more static program analysis techniques. Consequently, the system 100 can parse the code and determine the one or more APIs invoked by an application 107 (e.g., a weather application). In one embodiment, the system 100 can also process and/or facilitate a processing of an application code via one or more execution simulation techniques. By way of example, the system 100 can cause, at least in part, one or more simulations of the application's execution under "all" possible operating environments, for example.

In one or more embodiments, the system 100 causes, at least in part, a profiling or detecting of one or more invocation characteristics of the one or more APIs. By way of example, the one or more invocation characteristics can include, at least in part, mobile resources accessed by an application (e.g., one or more sensors 109, a microphone, a camera, etc.); type of data collected by an application 107; frequency of access; whether the access is performed periodically (e.g., as a background process) or in response to a specific user request (e.g., a user generated event such as touching an interface of a UE 101; persistence both in terms of data stored on a UE 101 and in a backend database (e.g., the at least one applications database 113); and transmissions by an application 107 to the outside (e.g., via a service 117, Bluetooth®, etc.). In one embodiment, the system 100 can also determine one or more invocation characteristics (especially non-deterministic ones such as frequency of access, for example) based, at least in part, on the one or more simulation results determined by the system 100 from the one or more execution simulations. In one embodiment, the system 100 determines one or more data types collected by the application code. By way of example, the one or more data types may include, at least in part, location data, contacts data, content data (e.g., pictures, videos, files, etc.), or a combination thereof. In one example use case regarding location data, the system 100 can process and/or facilitate a processing of an application code to identify a list of the invoked QT APIs, for example. In one embodiment, it is contemplated that one such invoked function is QGeoPositionInfoSource( ). The data type in this case is the corresponding Qt module, (i.e., <d>:="Location").

The system 100 in certain embodiments determines one or more resources accessed by the application code. In particular, in one embodiment, the determination of the one or more resources accessed is based, at least in part, on the determination of the one or more data types collected. For example, for a location data type, the one or more corresponding resources could be GPS, cellular triangulation, A-GPS, wireless fidelity (WiFi), etc. By way of further example, in the location data example use case, based on the invoked function QGeoPositionInfoSource( ), the system 100 can determine that the resources accessed are: <r1>:="Satellite based positioning/GPS".

In one embodiment, the system 100 determines at least one frequency of access to the one or more APIs. In particular, the system 100 determines the at least one frequency only if the application performs one or more periodic accesses. By way of example, in the location data example use case, the system 100 can determine the at least one frequency based, at least in part, on the invoked function QGeoPositionInfoSource( ):setUpdateInterval(interval) such that <f>:="interval".

In one or more embodiments, the system 100 determines whether access to the one or more APIs is performed periodically, continuously, according to schedule, user initiated, or a combination thereof. More specifically, a user initiated access is an access by an application 107 in response to a specific user request (e.g., a user generated event such as touching an interface of a UE 101). Continuing with the location data example use case, the system 100 can parse one or more function invocation sequences to determine whether a location data request QGeoPositionInfoSource( ):requestUpdate( ) for example, is performed in response to a user generated event (e.g., touch event <QTouchEvent>). If the system 100 determines such an invocation sequence, then the system 100 determines <ui>:="true", otherwise the system 100 determines <ui>:="false".

The system 100 in certain embodiments determines persistence information for the one or more data types collected by the application code. By way of example, if the system 100 determines that the accessed data is persisted, then the data is either stored locally (e.g., on a UE 101) or on one or more backend databases (e.g., the at least one applications database 113), or both. In one embodiment, the system 100 determines the one or more storage characteristics based, at least in part, on (1) determining the relevant data variables; and (2) cross-referencing the "update" variable with QFile and QSql function invocations, for example, to enable the system 100 to detect instances where the (data) updates are stored locally and in backend databases, respectively. For location data, the relevant data variable would be the "update" variable in the function call: QGeoPositionInfoSource( ):positionUpdate(update), for example. By way of further example, the system 100 can populate the <s> variable as either "Phone and Database", "Phone", "Database", or "No storage".

In one embodiment, the system 100 determines a transmission of the one or more data types to one or more external devices. By way of example, the system 100 can determine whether an application (e.g., an application 107) transmits the one or more data types to the outside world via a network service 117, Bluetooth®, etc. The storage details are important from a privacy perspective as they allow a third party, for example, to profile (mine) historical data that can reveal one or more personal details about a user not evident from real-time data. In one embodiment, the system 100 can determine with whom (e.g., <p1, p2, . . . >) the data is shared based, at least in part, on one or more users/groups that have access to a backend database where a user's phone data (e.g., "update" values) are stored.

In one or more embodiments, the system 100 causes, at least in part, a tracking of data accessed or stored via the one or more APIs (i.e., the static analysis techniques are extended by the system 100 to keep track of the accessed data, even after it has been stored in a database). More specifically, the system 100 can (a) determine one or more database tables where the data is stored; (b) determine one or more users having access to the one or more database tables; and (c) parse one or more database triggers if defined. In one embodiment, it is contemplated that by tracking the data, the system 100 may identify one or more parties with whom the data is shared, which as discussed above is important from a privacy perspective.

In one embodiment, the system 100 determines the one or more policy templates based, at least in part, on the one or more data types collected. In one embodiment, the one or more policy templates are pre-defined, include one or more variable privacy parameters, can be stored in the at least one applications database 113, and once generated, can be re-used by the system 100 for one or more other applications. Further, the one or more policy templates include, at least in part, pre-defined text corresponding to one or more different inference levels. By way of example, as previously discussed, a policy template for data type <d> may include, at least in part, "App A uses your <d> data. The app collects this data by accessing resources <r1, r2, . . . > on your phone. The sensors are accessed periodically with frequency <f> and/or user initiated <ui>. The access data is stored on <s>. The stored data is shared with parties <p1, p2, . . . >. This collected <d> data is used to infer the following information about you: <level>."

In one or more embodiments, the system 100 determines one or more inference levels based, at least in part, on at least one function of one or more access characteristics for the one or more data types. By way of example, the system 100 can compute an inference level as a function of the one or more resources accessed <r1, r2, . . . >, the at least one frequency of the access <f>, whether the access is user initiated <ui>, the persistence information <storage>, or a combination thereof. Consequently, <level>:=function(<r1, r2, . . . >, <f>, <ui>, <storage>)→{High, Low, Medium}. In particular, the one or more inference levels determined by the system 100 highlight the type of profiling performed by an application 107 on the accessed data. In addition, as discussed above, the one or more policy templates include pre-defined text also stored in the at least one applications database 113 for different inference levels. For example, in the location data example use case, the pre-defined text corresponding to a high inference level may include, at least in part, the following text: "The collected location data is used to infer your location in real-time. The application uses stored historical data to infer your movement patterns, frequently visited places (e.g., office, home, etc.), etc." Similarly, the pre-defined text corresponding to a medium inference level may include, at least in part, the following text: "The collected location data is used to infer your location in real-time." Last, the pre-defined text corresponding to a low inference level may include, at least in part, the following text: "The collected location data is used to infer your location, only when you explicitly request for it." In one embodiment, determining a low or medium inference level enables the system 100 to differentiate between one or more application accesses based on an explicit user request (e.g., a user generated event) and one or more application accesses performed by an application in the background (most likely without the user's knowledge) and hence having a higher privacy impact.

In one embodiment, the system 100 causes, at least in part, a mapping of the one or more invocation characteristics against the one or more policy templates to cause, at least in part, a generation of at least one policy for the application code (e.g., a privacy policy). In particular, in one embodiment, the system 100 populates the one or more template variables (in < >) of the one or more policy templates with one or more corresponding values derived from the static analysis output, which in turn determines the one or more application specific privacy policies. By way of example, based, at least in part, on the following parameter values: <d>:="Location", <r1>:="Satellite based positioning/GPS", <f>:="F", <ui>:="False", <s>:="Phone", and <level>:="function(GPS, F, False, Phone)→High", the system 100 can determine the following example application location privacy policy:

App A uses your location data. The app collects this data by accessing satellite based positioning resources on your phone. The resources are accessed with frequency F. The accessed data is only stored locally on your phone. The collected location data is used to infer your location in real-time. The app uses stored historical location data to infer your movement patterns, frequently visited places (e.g., office, home, etc.), etc.

Although the example use case described above pertains to a mapping process for a 'Location' data type, in one embodiment, it is contemplated that the mapping process for other data types such as contacts, content, etc. can be performed by the system 100 in the same manner. In one embodiment, the system 100 can also cause, at least in part, a mapping of the one or more invocation characteristics (e.g., frequency of access) determined by the system 100 from the one or more simulation results against one or more policy templates to cause, at least in part, a generation of at least one policy for the relative application code.

The system 100 in certain embodiments causes, at least in part, a presentation of the at least one policy on at least one user device (e.g., a UE 101 such as a mobile phone) prior to at least one installation of the application code on the at least one device. By way of example, the presentation can be organized based, at least in part, on the one or more data types collected by the application code (e.g., location, contacts, pictures, music, videos, documents, etc.). Thereafter, if the system 100 determines one or more user generated events (e.g., a touch) with the one or more data type labels (e.g., location) featured on a user interface of the at least one of device (e.g., a display), then the system 100 can cause, at least in part, a presentation of the corresponding privacy policy on the at least one user device.

By way of example, the UEs 101, the policy platform 103, the applications 107, the sensors 109, the policy module 111, the at least one applications database 113, the services platform 115, the services 117, the content providers 119, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
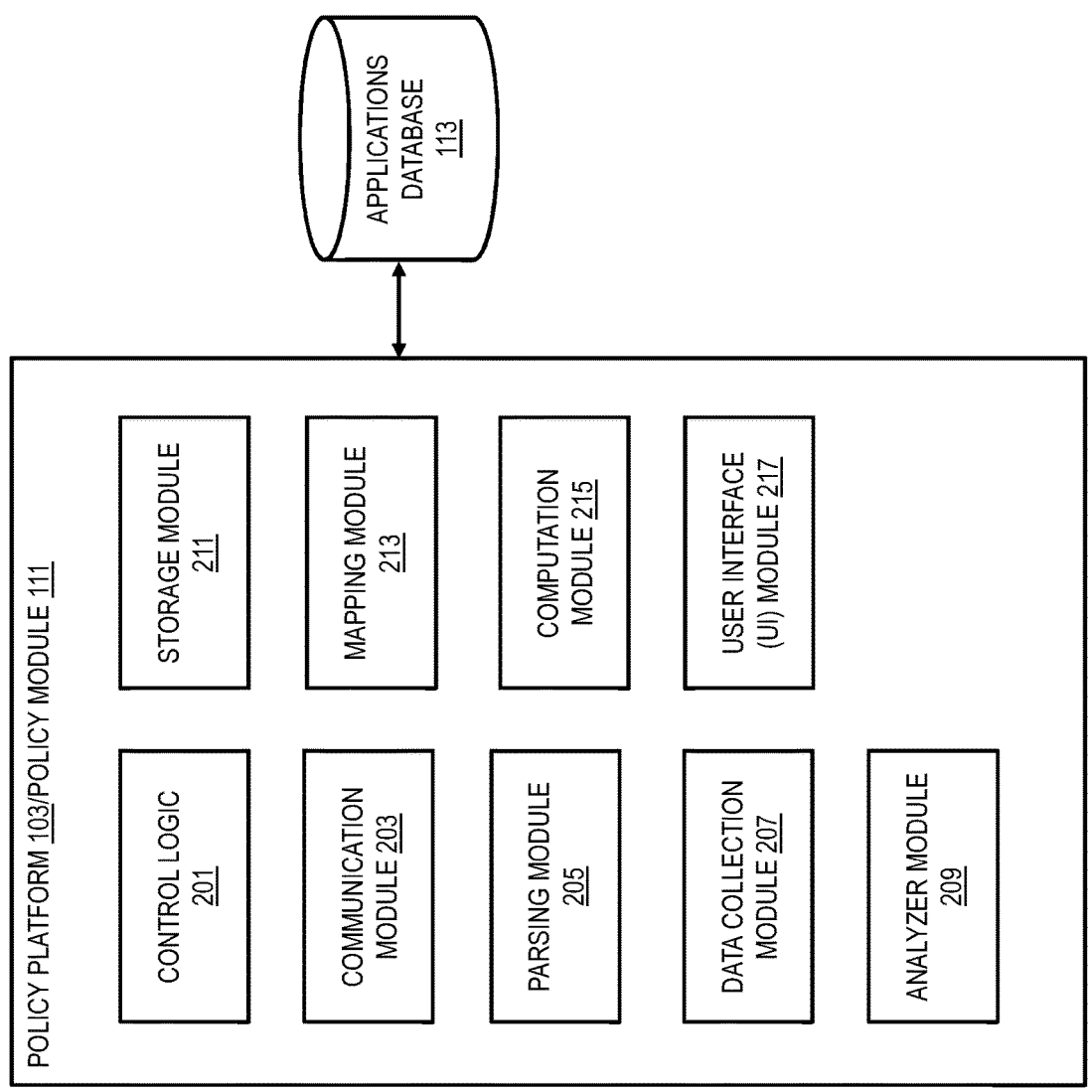
FIG. 2 is a diagram of the components of a policy platform/policy module, according to one embodiment.

FIG. 2 is a diagram of the components of a policy platform 103/policy module 111, according to one embodiment, according to one embodiment. While the policy platform 103 and the policy module 111 are interchangeable, the various embodiments of the present invention disclosed herein mainly reference the policy platform 103 for the sake of explanation. By way of example, the policy platform 103 includes one or more components for transforming application access and data storage details associated with a mobile device to application specific privacy policies. It is contemplated that the functions of these components may be combined in one or more components or performed by other components of equivalent functionality. In this embodiment, the policy platform 103 includes a control logic 201, a communication module 203, a parsing module 205, a data collection module 207, an analyzer module 209, a storage module 211, a mapping module 213, a computation module 215, and a user interface (UI) module 217.

In one embodiment, the control logic 201 oversees tasks, including tasks performed by the communication module 203, the parsing module 205, the data collection module 207, the analyzer module 209, the storage module 211, the mapping module 213, the computation module 215, and the UI module 217. For example, although the other modules may perform the actual task, the control logic 201 may determine when and how those tasks are performed or otherwise direct the other modules to perform the task.

The communication module 203 in certain embodiments is used for communication between the UEs 101, the policy platform 103, the applications 107, the sensors 109, the policy module 111, the at least one applications database 113, the services platform 115, the services 117, the content providers 119, and the satellites 121. In one embodiment, the communication module 203 may also be used to communicate commands requests, data, etc. The communication module 203 also may be used to determine a transmission of one or more data types to one or more external devices (i.e., determine one or more parties with whom a data type is shared).

In one embodiment, the parsing module 205 is used to process and/or facilitate a processing of an application code to identify one or more APIs invoked by the application code. By way of example, the parsing module 205 processes and/or facilitates a processing of the application code based, at least in part, on one or more static program analysis techniques, one or more execution simulation techniques, or a combination thereof. In the location data example use case, the parsing module 205 can determine that of the one or more APIs invoked one such invoked function is QGeoPositionInfoSource( ).

The data collection module 207 in certain embodiments is used to cause, at least in part, a profiling of one or more invocation characteristics of the one or more APIs. For example, the data collection module 207 may be used to determine one or more data types collected by the application code (e.g., location data, contacts data, content data, etc.). The date collection module 207 also may be used to determine one or more resources accessed by an application. In particular, in one embodiment, the determination of the one or more resources accessed by an application is based, at least in part, on the determination by the data collection module 207 of the one or more data types collected by application code. By way of example, if the data collection module 207 determines that the data type corresponds to location data, the data collection module 207 can determine that one of the resources accessed is "Satellite based positioning/GPS", for example. The data collection module 207 may also determine at least one frequency of access to the one or more APIs (assuming the particular application performs one or more periodic accesses). In one embodiment, the data collection module 207 also may be used to determine one or more invocation characteristics (especially non-deterministic ones such as frequency of access, for example) based, at least in part, on the one or more simulations results determined by the data collection module 207, in connection with the parsing module 205, from the one or more execution simulations.

In one or more embodiments, the analyzer module 209, in connection with the data collection module 207 and the UI module 217, determines whether access to the one or more APIs is performed periodically, continuously, according to a schedule, user initiated, or a combination thereof. By way of example, the analyzer module 209, in connection with the UI module 217, can determine whether a location data request QGeoPositionInfoSource( ):requestUpdate( ), for example, is performed in response to a user generated event (e.g., touch event <QTouchEvent>). The analyzer module 209 may also be used to determine the one or more policy templates based, at least in part, on comparing the one or more data types collected with metadata associated with the one or more policy templates, for example.

In one embodiment, the storage module 211 is used to manage the storage of one or more privacy policy templates, one or more pre-defined text entries for one or more inference levels, one or more lists of users/groups having access to the at least one applications database, or a combination thereof stored in the at least one applications database 113. In one embodiment, the storage module 211 may also be used to determine persistence information for the one or more data types collected by the application code. For example, the storage module 211 can determine whether the data is being stored on a mobile device (e.g., a UE 101) and/or on a backend database (e.g., the at least one applications database 113).

In one embodiment, the mapping module 213, in connection with the parsing module 205, is used to case, at least in part, a tracking of data accessed or stored via the one or more APIs. More specifically, the mapping module 213, in connection with the parsing module 205, can (a) determine one or more database tables where the data is stored; (b) determine one or more users having access to the one or more database tables; and (c) parse one or more database triggers if defined. The mapping module 213 may also be used to cause, at least in part, a mapping of the one or more invocation characteristics against one or more policy templates to cause, at least in part, a generation of at least one policy for the application code. For example, the mapping module 213 can populate the one or more template parameter values by extracting the one or more corresponding values from the static analysis output from the parsing module 205 and thereby create one or more application specific privacy policies. In one embodiment, the mapping module 213 also may be used to cause, at least in part, a mapping of the one or more invocation characteristics (e.g., frequency of access) determined by the data collection module 207 from the one or more simulation results against one or more policy templates to cause, at least in part, a generation of at least one policy for the relative application code.

The computation module 215 in certain embodiments is used to determine one or more inference levels based, at least in part, on at least one function of one or more access characteristics for the one or more data types. For example, the computation module 215 can determine the inference level based, at least in part, on a function of the one or more resources accessed <r1, r2, . . . >, the at least one frequency of the access <f>, whether the access is user initiated <ui>, the persistence information <storage>, or a combination thereof. Therefore, <level>:=function(<r1, r2, . . . >, <f>, <ui>, <storage>)→{High, Low, Medium}.

In one embodiment, the user interface (UI) module 217 is used to cause, at least in part, a presentation of the at least one policy on at least one user device (e.g., a mobile phone) prior to at least one installation of the application code on the at least one device. For example, the UI module 217 can cause, at least in part, the presentation to be organized based, at least in part, on the one or more data types collected by the application code (e.g., location, contacts, pictures, music, videos, documents, etc.). Thereafter, if the UI module 217 determines one or more user generated events (e.g., a touch) with the one or more data type labels (e.g., location) featured in an interface of the at least one device, the UI module 217, in connection with the mapping module 213, can cause, at least in part, a presentation of the corresponding privacy policy template on the at least one device.

Figure 3:
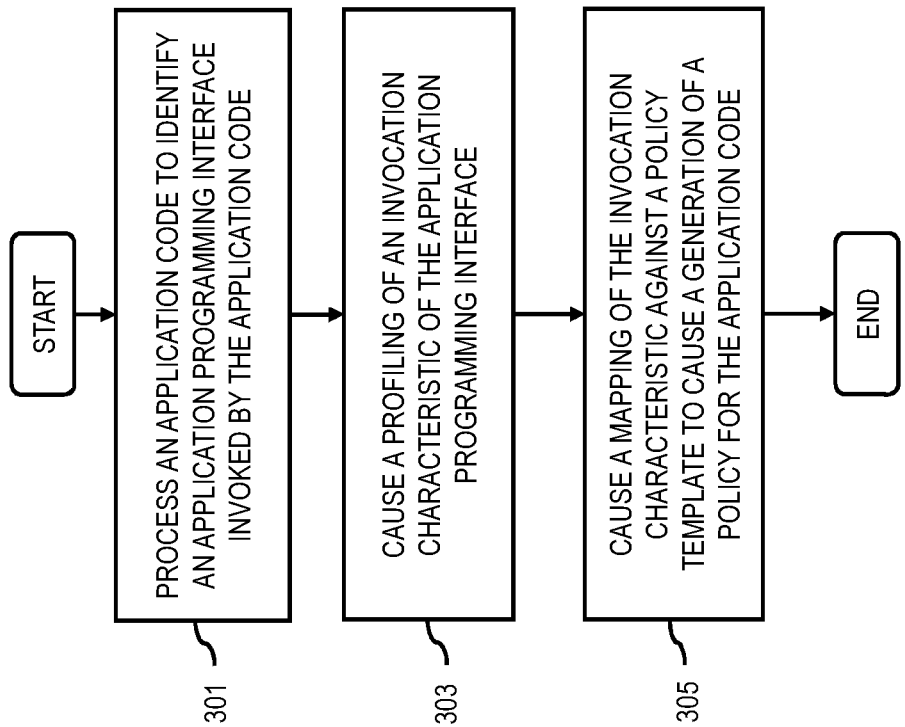
FIGS. 3-5 are flowcharts of processes for transforming application access and data storage details associated with a mobile device to application specific privacy policies, according to one embodiment.
Figure 4:
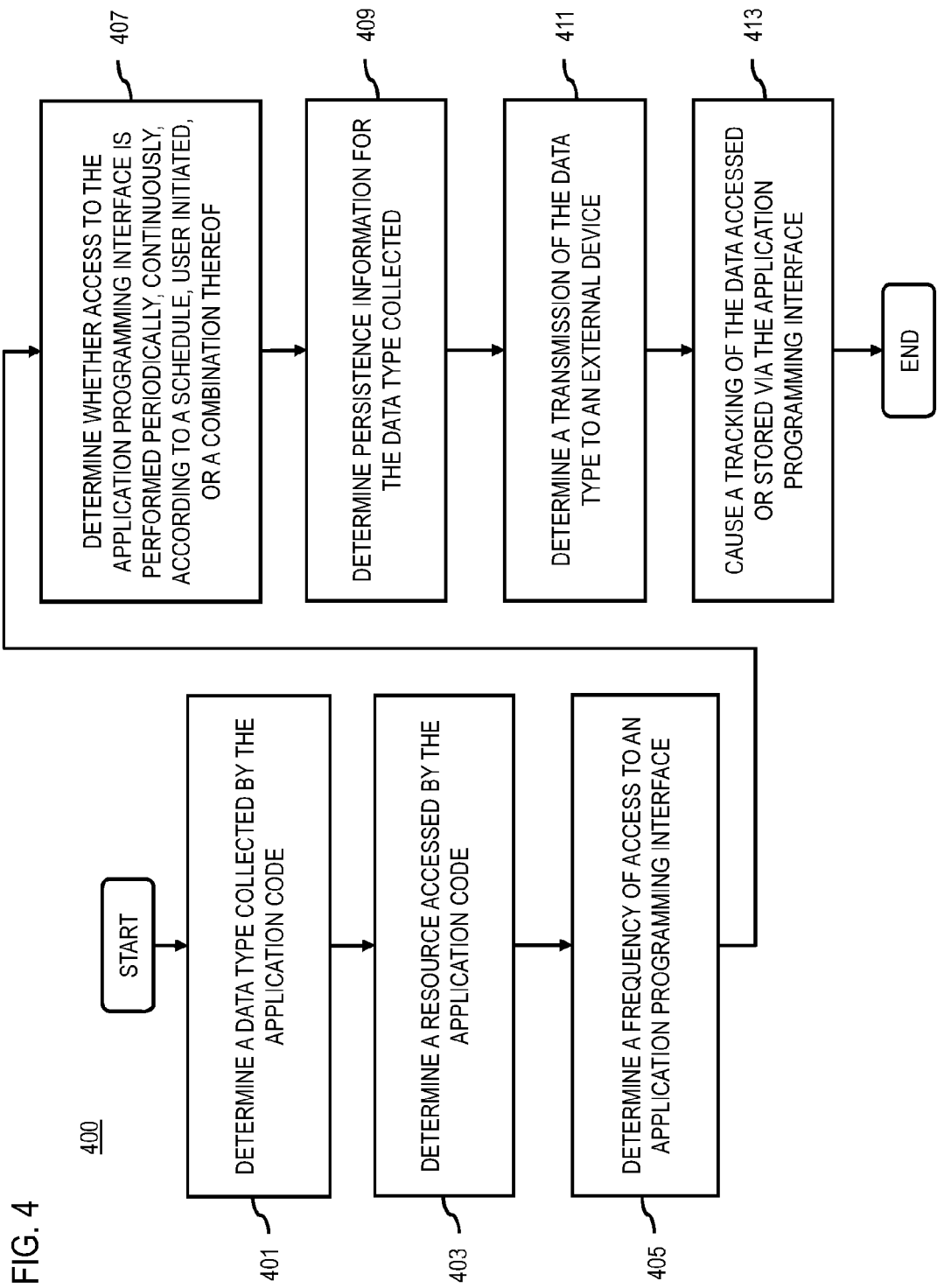
Figure 5:
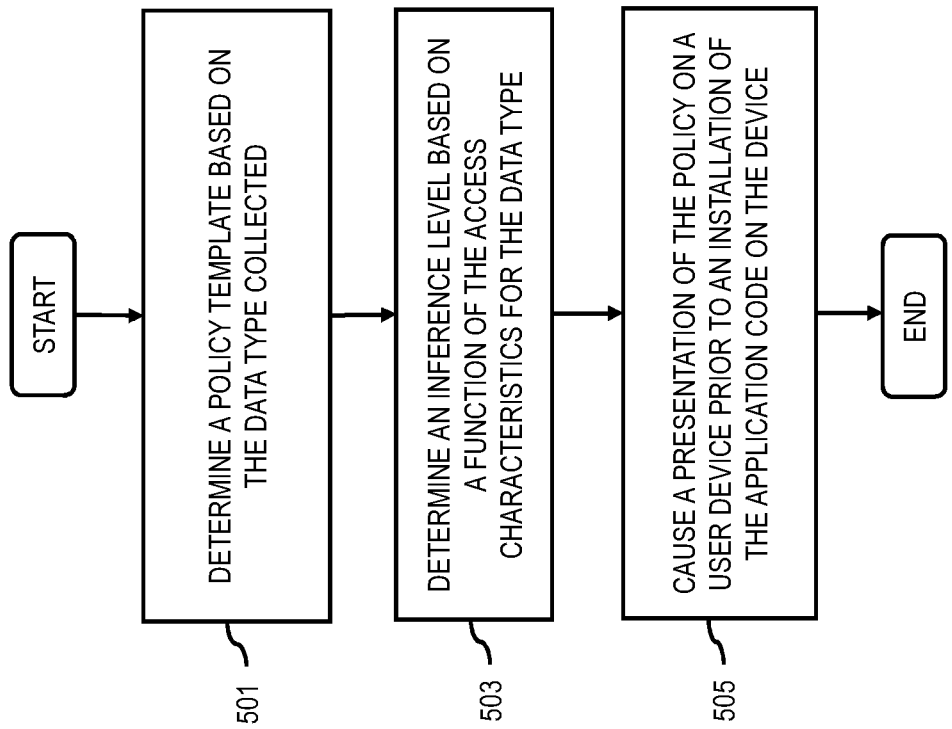
Figure 9:
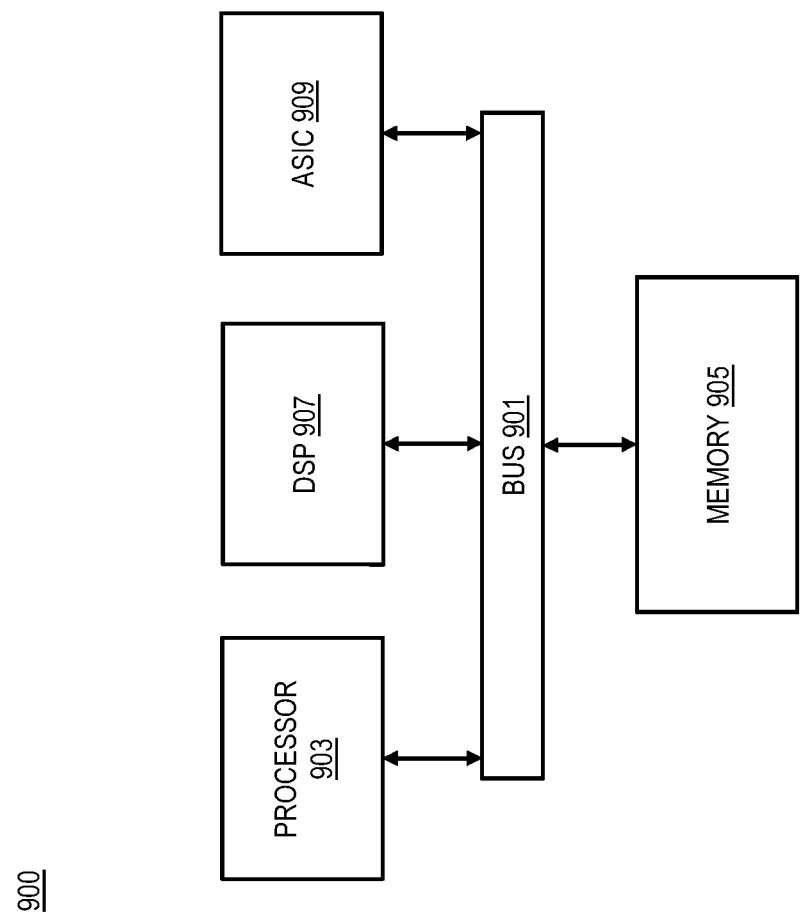
FIG. 9 is a diagram of a chip set that can be used to implement an embodiment of the invention.

FIGS. 3-5 are flowcharts of processes for transforming application access and data storage details associated with a mobile device to application specific privacy policies, according to one embodiment. In one embodiment, the policy platform 103/policy module 111 performs the process 300 and is implemented in, for instance, a chip set including a processor and a memory as shown in FIG. 9. In step 301, the policy platform 103 processes and/or facilitates a processing of application code to identify one or more application programming interfaces invoked by the application code. By way of example, the policy platform 103 processes and/or facilitates a processing of an application code by employing one or more static program analysis techniques. By way of example, the policy platform 103 can parse the code and determine the one or more APIs invoked by the particular application (e.g., a weather application). In one embodiment, the policy platform 103 can also process and/or facilitate a processing of an application code via one or more execution simulation techniques. By way of example, the policy platform 103 can cause, at least in part, one or more simulations of the application's execution under "all" possible operating environments, for example.

In step 303, the policy platform 103 causes, at least in part, a profiling of one or more invocation characteristics of the one or more application programming interfaces. By way of example, the one or more invocation characteristics that the policy platform 103 can detect include, at least in part, mobile resources accessed by an application (e.g., one or more sensors, a microphone, a camera, etc.); types of data collected from them; frequency of access; whether the access is performed periodically (e.g., as a background process) or in response to a specific user request (e.g., a user generated event); persistence both in terms of data stored on a mobile device and/or in backend databases; and transmission to the outside (e.g., via network services, Bluetooth®, etc.). In one embodiment, the policy platform 103 can also determine one or more invocation characteristics (especially non-deterministic ones such as frequency of access, for example) based, at least in part, on the one or more simulation results determined by the policy platform 103 from the one or more execution simulations.

In step 305, the policy platform 103 causes, at least in part, a mapping of the one or more invocation characteristics against one or more policy templates to cause, at least in part, a generation of at least one policy for the application code. By way of example, in one embodiment, the policy platform 103 populates the one or more template variables (in < >) of the one or more policy templates with one or more corresponding values derived from the static analysis output, which in turn determines the one or more application specific privacy policies. For example, the one or more parameter values may include the following: <d>:="Location"; <r1>:="Satellite based positioning/GPS"; <f>:="F"; <ui>:="False"; <s>:="Phone"; and <level>:="function (GPS, F, False, Phone)→High". As a result, the policy platform 103 can determine the following example application specific privacy policy:

App A uses your location data. The app collects this data by accessing satellite based positioning resources on your phone. The resources are accessed with frequency F. The accessed data is only stored locally on your phone. The collected location data is used to infer your location in real-time. The app uses stored historical location data to infer your movement patterns, frequently visited places (e.g., office, home, etc.), etc.

In one embodiment, the policy platform 103 can also cause, at least in part, a mapping of the one or more invocation characteristics (e.g., frequency of access) determined by the policy platform 103 from the one or more simulation results against one or more policy templates to cause, at least in part, a generation of at least one policy for the relative application code.

FIG. 4 depicts a process 400 of profiling the one or more invocation characteristics of the one or more APIs. In one embodiment, the policy platform 103/policy module 111 performs the process 400 and is implemented in, for instance, a chip set including a processor and a memory as shown in FIG. 9. In step 401, the policy platform 103 determines one or more data types collected by the application code. By way of example, the one or more data types may include, at least in part, location data, contacts data, content data (e.g., pictures, videos, files, etc.). Further in the location data example use case, the policy platform 103 can determine that the invoked function is QGeoPositionInfoSource( ), for example, and therefore the corresponding Qt module, for example, would be: <d>:="Location".

In step 403, the policy platform 103 determines one or more resources accessed by the application code. In particular, in one embodiment, the policy platform 103 determines the one or more accessed resources based, at least in part, on the determination by the policy platform 103 of the one or more data types collected by the application code. For example, for a location data type, the one or more corresponding resources could be GPS, cellular triangulation, A-GPS, WiFi, etc. By way of further example, if the invoked function is QGeoPositionInfoSource( ), for example, the policy platform 103 can determine that the resource accessed is: <r1>:="Satellite based positioning/GPS".

In step 405, the policy platform 103 determines at least one frequency of access to the one or more application programming interfaces. By way example, in the location data example use case, the policy platform 103 can determine the at least one frequency based, at least in part, on the invoked function QGeoPositionInfoSource( ):setUpdateInterval(interval) such that <f>:="interval".

In step 407, the policy platform 103 determines whether access to the one or more application programming interfaces is performed periodically, continuously, according to a schedule, user initiated, or a combination thereof. By way of example, one or more user initiated accesses are accesses by one or more applications in response to a specific user request (e.g., a user generated event such as touching an interface of a mobile device). By way of further example, the policy platform 103 can parse one or more function invocation sequences to determine whether a location data request (e.g., QGeoPositionInfoSource:requestUpdate( )), is performed in response to a user generated event (e.g., touch event <QTouchEvent>). Consequently, if the policy platform 103 determines such an invocation sequence, then the policy platform 103 determines <ui>:="True", otherwise, the policy platform 103 determines <ui>:="false".

In step 409, the policy platform 103 determines persistence information for the one or more data types collected by the application code. By way of example, if the policy platform 103 determines that the accessed data is persisted, then the data is either stored locally (e.g., on a mobile device) or on one or more backend databases, or both. In one embodiment, the policy platform 103 determines the one or more storage characteristics based, at least in part, on (1) determining the relevant data variable; and (2) cross-referencing the "update" variable with QFile and QSql function invocations, for example, to enable the policy platform 103 to detect one or more instances where the (data) updates are stored locally and in backend databases, respectively. For location data, the relevant data variable would be the "update" variable in the function call: QGeoPositionInfoSource( )::positionUpdate(update), for example.

In step 411, the policy platform 103 determines a transmission of the one or more data types to one or more external devices. By way of example, the policy platform 103 can determine whether an application transmits the one or more data types to the outside world via one or more network services, Bluetooth®, etc. Further, in one embodiment, the policy platform 103 can determine with whom <p1, p2, . . . > the data is shared based, at least in part, on the users/groups that have access to the one or more backend databases where the user's mobile device data ("update" values) is stored.

In step 413, the policy platform 103 causes, at least in part, a tracking of data accessed or stored via the one or more application programming interfaces, wherein the profiling of the one or more invocation characteristics further comprises at least one of: (a) determining one or more database tables where the data is stored; (b) determining one or more users having access to the one or more database tables; and (c) parsing one or more database triggers if defined. Consequently, the policy platform 103 can keep track of the accessed data even after it has been stored in one or more databases. By way of example, it is contemplated that the tracking of the data by the policy platform 103 can enable the policy platform 103 to identify one or more parties with whom the data is shared, which as discussed above is an important factor from a privacy perspective.

FIG. 5 depicts a process 500 of mapping the one or more invocation characteristics against one or more policy templates. In one embodiment, the policy platform 103/policy module 111 performs the process 500 and is implemented in, for instance, a chip set including a processor and a memory as shown in FIG. 9. In step 501, the policy platform 103 determines the one or more policy templates based, at least in part, on the one or more data types collected, wherein the one or more data types include, at least in part, location data, contacts data, content data, or a combination thereof. By way of example, the one or more policy templates are pre-defined, include one or more variable privacy parameters, can be stored in a backend database, and once generated, can be re-used by the policy platform 103 for one or more other applications. In addition, in one embodiment, the one or more policy templates also include, at least in part, pre-defined text corresponding to one or more different inference levels.

In step 503, the policy platform 103 determines one or more inference levels based, at least in part, on at least one function of one or more access characteristics for the one or more data types, wherein the one or more policy templates include, at least in part, pre-defined text corresponding to the one or more inference levels. By way of example, the policy platform 103 can compute the inference level as a function of the one or more resources accessed <r1, r2, . . . >, the at least one frequency of the access <f>, whether the access is user initiated <ui>, the persistence information <storage>, or a combination thereof. Consequently, <level>:= function(<r1, r2, . . . >, <f>, <ui>, <storage>)→{High, Low, Medium}. In particular, the one or more inference levels determined by the privacy platform 103 can highlight the type of profiling performed by one or more applications (e.g., an application 107) on the accessed data. By way of further example, the pre-defined text corresponding to a high inference level may include, at least in part, the following text: "The collected location data is used to infer your location in real-time. The application uses stored historical data to infer your movement patterns, frequently visited places (e.g., office, home, etc.), etc." In contrast, the pre-defined text corresponding to a low inference level may include, at least in part, the following text: "The collected location data is used to infer your location, only when you explicitly request for it."

In step 505, the policy platform 103 causes, at least in part, a presentation of the at least one policy on at least one user device prior to at least one installation of the application code on the at least one device. By way of example, the presentation can be organized based, at least in part, on the one or more data types collected by the application code (e.g., location, contacts, pictures, music, videos, documents, etc.). Thereafter, if the policy platform 103 determines one or more user generated events (e.g., a touch) with the one or more data type labels (e.g., location) featured on a user interface of the at least one device, for example, then the policy platform 103 can cause, at least in part, a presentation of the corresponding privacy policy on the at least one user device.

Figure 6:
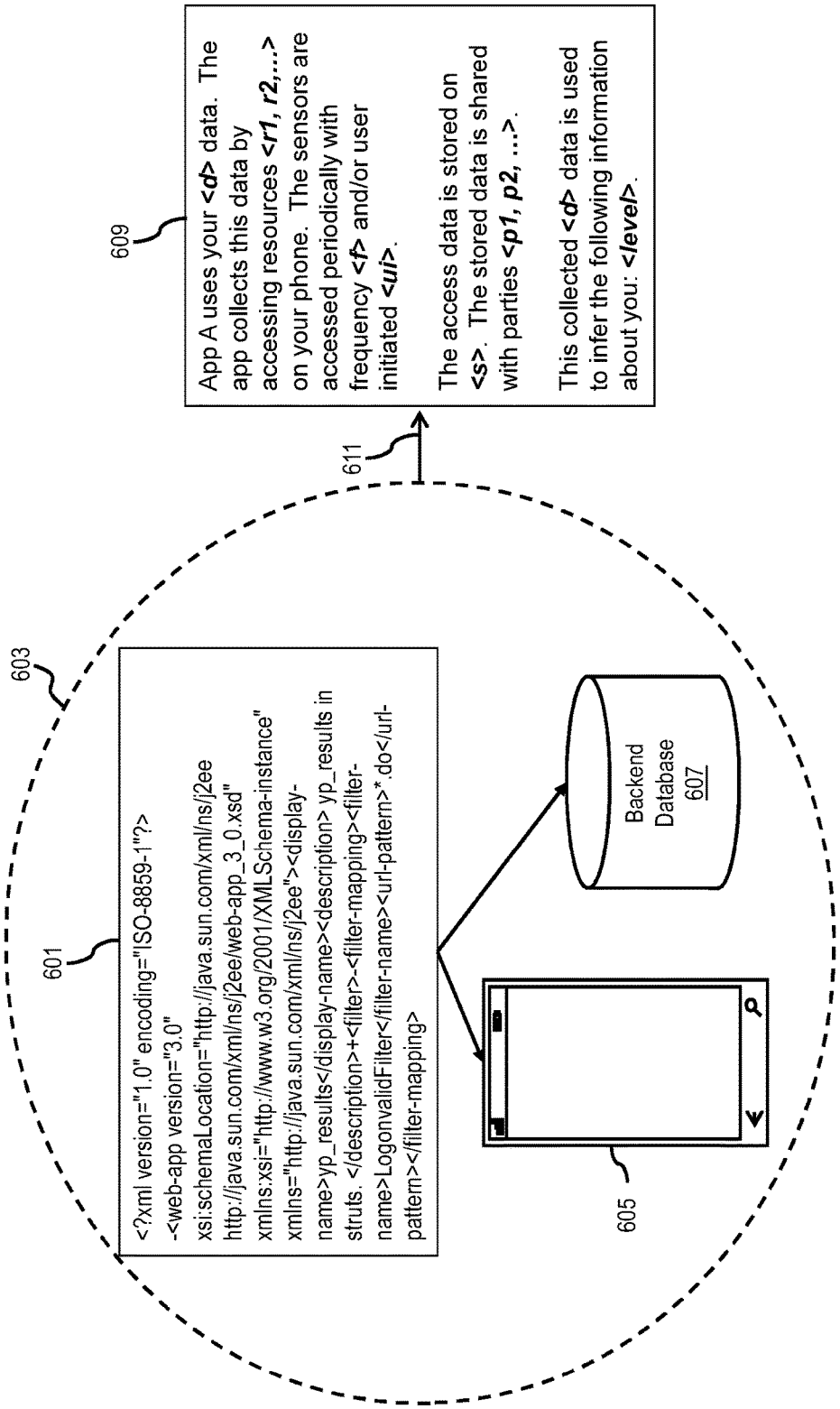
FIG. 6 is a diagram of an example data flow and a privacy policy template as utilized in the processes of FIGS. 3-5, according to various embodiments.

FIG. 6 is a diagram of an example data flow and a privacy policy template as utilized in the processes of FIGS. 3-5, according to various embodiments. As previously discussed, in one embodiment, the system 100 processes and/or facilitates a processing of an application code 601 to identify one or more APIs invoked by the application code 601. In this example use case, the system 100 applies one or more static program analysis techniques to parse the application code 601 as represented by the dashed circle 603. In one or more embodiments, the system 100 then causes, at least in part, a profiling of one or more invocation characteristics of the one or more APIs (e.g., data types collected, resources accessed, frequency of access, whether the access is user initiated, persistence information, transmissions to the outside world, etc.). By way of example, if the system 100 determines that the information is persisted, then the system 100 can determine whether the data is stored locally on a user device (e.g., a mobile phone 605), on one or more backend databases 607, or both. In one embodiment, it is contemplated that storage details are important from a privacy perspective because they can allow a third party to profile (mine) historical data, which can reveal personal details about a user that is not evident from real-time data.

In one embodiment, the system 100 determines the one or more policy templates (e.g., policy template 609) based, at least in part, on the one or more data types collected (e.g., location data) by the application code 601. More specifically, the policy template 609 includes one or more variable privacy parameters as denoted in boldface type, which enables the system 100 to re-use the policy template 609 for one or more other applications. In one embodiment, the system 100 then causes, at least in part, a mapping of the one or more invocation characteristics against the policy template 609. In particular, in one embodiment, the system 100 populates the one or more boldface template variables with one or more corresponding values derived from the static analysis output as represented by the arrow 611, which in turn enables the system 100 to determine the one or more application specific privacy policies as depicted in FIG. 7.

Figure 7:
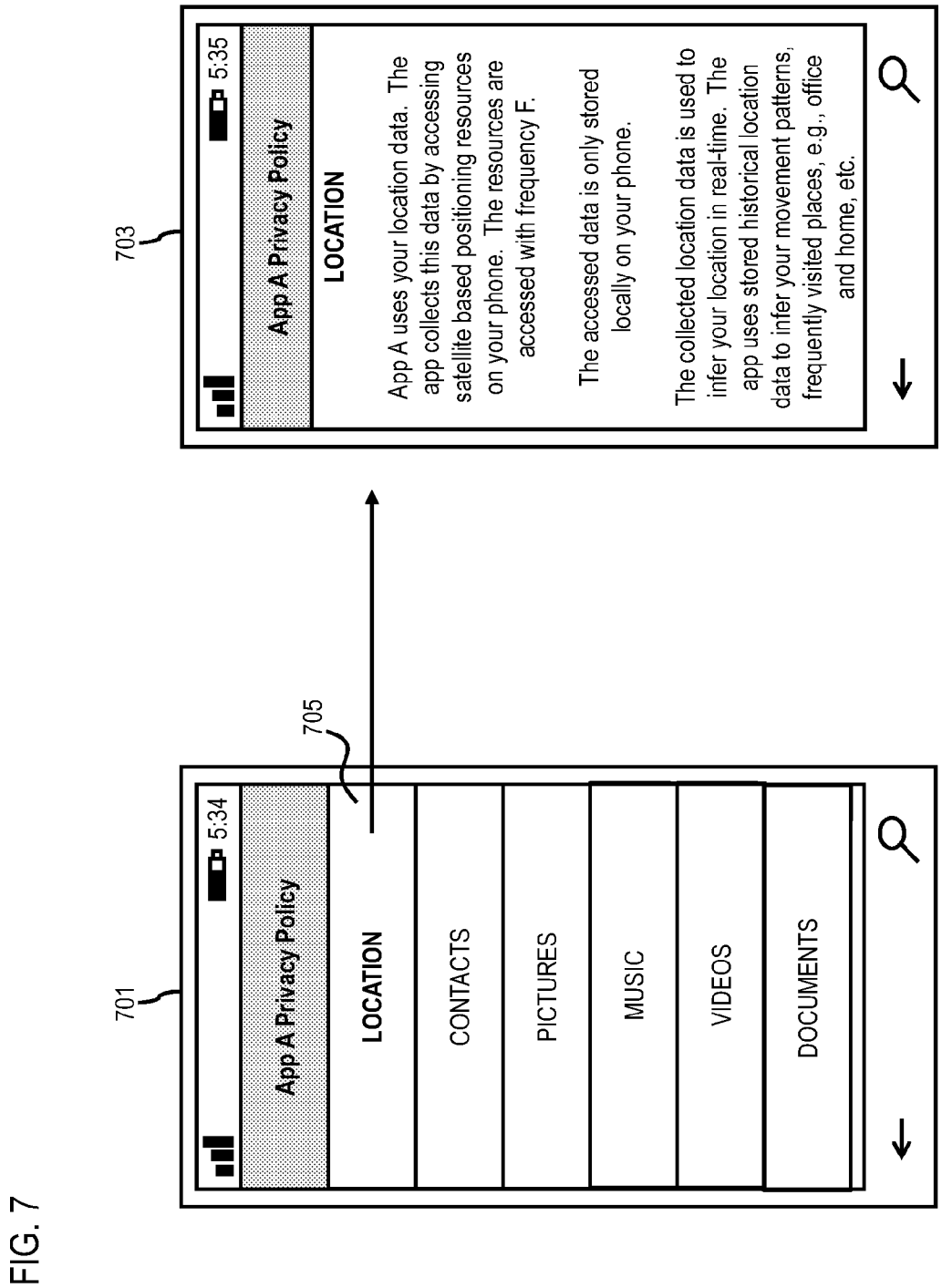
FIG. 7 is a diagram of user interfaces utilized in the processes of FIGS. 3-5, according to various embodiments.

FIG. 7 is a diagram of user interfaces utilized in the processes of FIGS. 3-5, according to various embodiments. As shown, the example use interfaces of FIG. 7 include one or more user interface elements and/or functionalities created and/or modified based, at least in part, on information, data, and/or signals resulting from the processes (e.g., 300, 400, and 500) described with respect to FIGS. 3-5. More specifically, FIG. 7 illustrates two user interfaces (e.g., 701 and 703) depicting a layered "Location" privacy policy on a mobile device (e.g., interfaces 701 and 703). In one embodiment, the system 100 causes, at least in part, a presentation of the at least one policy prior to at least one installation of the application code on the interfaces 701 and 703, for example. In particular, in one embodiment, the at least one policy is determined by the system 100 by causing, at least in part, a mapping of the one or more invocation characteristics against one or more policy templates as depicted in FIG. 6. In this example use case, a user (e.g., a developer or an end user) has decided to examine the privacy policy corresponding to location data as indicated by the highlighted user interface element 705. More specifically, in this example use case, because the system 100 determines the following parameter values based, at least in part, on profiling the one or more invocation characteristics of the one or more relative APIs as depicted in FIG. 6: <d>:="Location"; <r1>:="Satellite based positioning/GPS"; <f>:="F"; <ui>:="False"; <s>:="Phone"; and <level>:="function (GPS, F, False, Phone)→High", the system 100 causes, at least in part, the presentation of the privacy policy as depicted in interface 703, which is as follows:

App A uses your location data. The app collects this data by accessing satellite based positioning resources on your phone. The resources are accessed with frequency F. The accessed data is only stored locally on your phone. The collected location data is used to infer your location in real-time. The app uses stored historical location data to infer your movement patterns, frequently visited places (e.g., office, home, etc.), etc.

The processes described herein for transforming application access and data storage details associated with a mobile device to application specific privacy policies may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
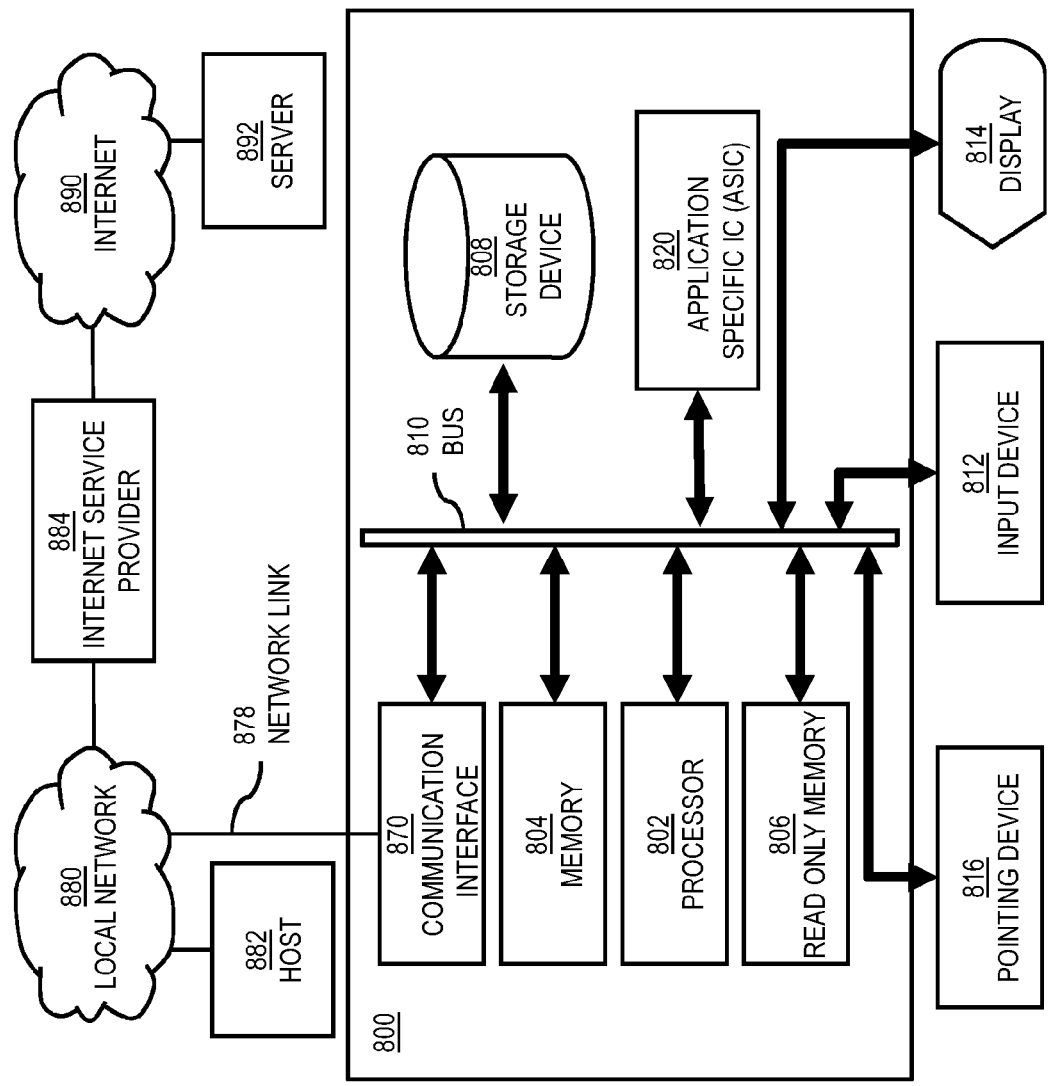
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to transform application access and data storage details associated with a mobile device to application specific privacy policies as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of transforming application access and data storage details associated with a mobile device to application specific privacy policies.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to transform application access and data storage details associated with a mobile device to application specific privacy policies. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for transforming application access and data storage details associated with a mobile device to application specific privacy policies. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for transforming application access and data storage details associated with a mobile device to application specific privacy policies, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for transforming application access and data storage details associated with a mobile device to application specific privacy policies to the UE 101s.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to transform application access and data storage details associated with a mobile device to application specific privacy policies as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of transforming application access and data storage details associated with a mobile device to application specific privacy policies.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to transform application access and data storage details associated with a mobile device to application specific privacy policies. The memory 905 also stores the data associated with or generated by the execution of the inventive steps.

Figure 10:
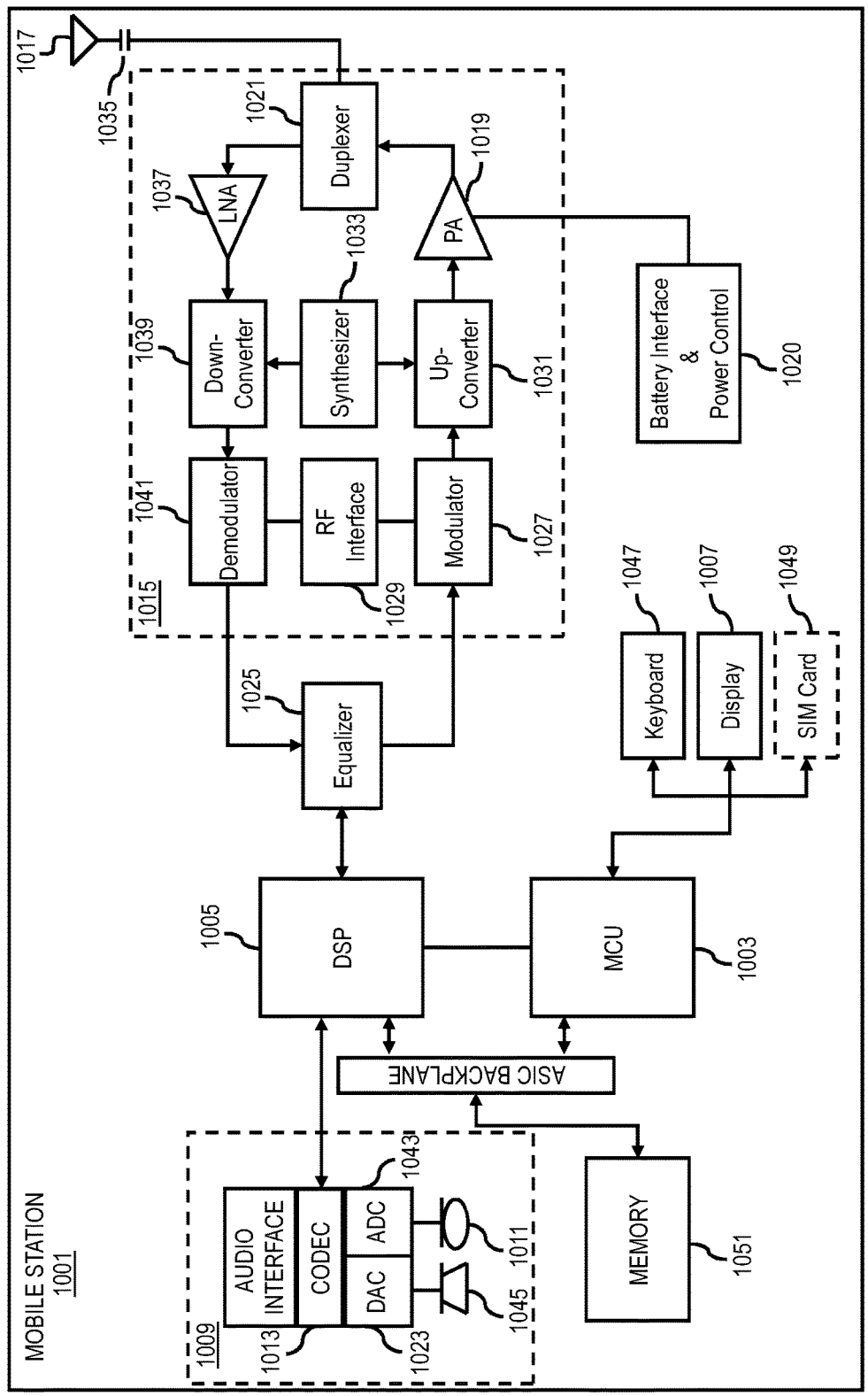
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of transforming application access and data storage details associated with a mobile device to application specific privacy policies. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of transforming application access and data storage details associated with a mobile device to application specific privacy policies. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to transform application access and data storage details associated with a mobile device to application specific privacy policies. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, with a processor, one or more application codes at a user device to determine one or more types of one or more applications;
   processing user information associated with the user device;
   determining location information of the user device;
   causing, at least in part, a generation of a privacy policy based, at least in part, on the user information, the location information, and the one or more types of the one or more applications; and
   determining one or more data types accessed by the one or more applications;

presenting, at the user device, a privacy policy template based on the one or more data types;
processing a user interaction with the privacy policy template; and
causing, at least in part, the generation of the privacy policy based on the user interaction.

2. A method of claim 1, further comprising:
determining the policy template based, at least in part, on the one or more data types collected,
wherein the one or more data types include, at least in part, location data, contacts data, content data, or a combination thereof.

3. A method of claim 1, further comprising:
determining one or more data types associated with one or more service requests from the one or more applications; and
causing, at least in part, the generation of the privacy policy based on the one or more data types associated with the one or more service requests.

4. A method of claim 3, further comprising:
determining one or more external sources for providing one or more services based, at least in part, on the one or more service requests; and
causing, at least in part, the generation of the privacy policy based, at least in part, on the one or more external sources.

5. A method of claim 1, further comprising:
presenting at the user device the privacy policy associated with the one or more application types, one or more services, or a combination thereof.

6. A method of claim 1, wherein the generation of the privacy policy further comprises at least one of:
determining one or more resources accessed by the one or more applications;
determining one or more data types collected by the one or more applications;
determining persistence information for the one or more data types collected by the one or more applications;
determining a transmission of the one or more data types to one or more external devices;
determining at least one frequency of access to the one or more applications; and
determining whether access to the one or more applications is performed periodically, continuously, according to a schedule, user initiated, or a combination thereof.

7. A method of claim 1, wherein the processing of the one or more application codes is via one or more static program analysis techniques, one or more execution simulation techniques, or a combination thereof.

8. An apparatus comprising:
at least one processor; and
at least one memory including computer program code,
the at least one memory and the computer program code configured to, with the at least one processor, cause a mobile terminal to perform at least the following,
process one or more application codes at a user device to determine one or more types of one or more applications;
process user information associated with the user device;
determine location information of the user device;
cause, at least in part, a generation of a privacy policy based, at least in part, on the user information, the location information, and the one or more types of the one or more applications; and determine one or more data types accessed by the one or more applications;
present, at the user device, a privacy policy template based on the one or more data types;
process a user interaction with the privacy policy template; and
cause, at least in part, the generation of the privacy policy based on the user interaction.

9. An apparatus of claim 8, wherein the apparatus is further caused to:
determine the policy template based, at least in part, on the one or more data types collected,
wherein the one or more data types include, at least in part, location data, contacts data, content data, or a combination thereof.

10. An apparatus of claim 8, wherein the apparatus is further caused to:
determine one or more data types associated with one or more service requests from the one or more applications; and
causing, at least in part, the generation of the privacy policy based on the one or more data types associated with the one or more service requests.

11. An apparatus of claim 10, wherein the apparatus is further caused to:
determine one or more external sources for providing one or more services based, at least in part, on the one or more service requests; and
cause, at least in part, the generation of the privacy policy based, at least in part, on the one or more external sources.

12. An apparatus of claim 8, wherein the apparatus is further caused to:
present at the user device the privacy policy associated with the one or more application types, one or more services, or a combination thereof.

13. An apparatus of claim 8, wherein for the generation of the privacy policy the apparatus is further caused to perform at least one of:
determine one or more resources accessed by the one or more applications;
determine one or more data types collected by the one or more applications;
determine persistence information for the one or more data types collected by the one or more applications;
determine a transmission of the one or more data types to one or more external devices;
determine at least one frequency of access to the one or more applications; and
determine whether access to the one or more applications is performed periodically, continuously, according to a schedule, user initiated, or a combination thereof.

14. An apparatus of claim 8, wherein the processing of the one or more application codes is via one or more static program analysis techniques, one or more execution simulation techniques, or a combination thereof.

15. A non-transitory computer-readable storage medium carrying one or more sequences of one or more instructions which, when executed by one or more processors, cause an apparatus to at least perform the following steps:
process one or more application codes at a user device to determine one or more types of one or more applications;
process user information associated with the user device;
determine location information of the user device; and
cause, at least in part, a generation of a privacy policy based, at least in part, on the user information, the location information, and the one or more types of the one or more applications; and determine one or more data types accessed by the one or more applications;

present, at the user device, a privacy policy template based on the one or more data types;

process a user interaction with the privacy policy template; and cause, at least in part, the generation of the privacy policy based on the user interaction.

16. A non-transitory computer-readable storage medium of claim 15, wherein the apparatus is further caused to:

determine the policy template based, at least in part, on the one or more data types collected, wherein the one or more data types include, at least in part, location data, contacts data, content data, or a combination thereof.

17. A non-transitory computer-readable storage medium of claim 15, wherein for the generation of the privacy policy the apparatus is further caused to perform at least one of:

determine one or more resources accessed by the one or more applications;

determine one or more data types collected by the one or more applications;

determine persistence information for the one or more data types collected by the one or more applications;

determine a transmission of the one or more data types to one or more external devices;

determine at least one frequency of access to the one or more applications; and determine whether access to the one or more applications is performed periodically, continuously, according to a schedule, user initiated, or a combination thereof.

* * * * *